Figure 1:
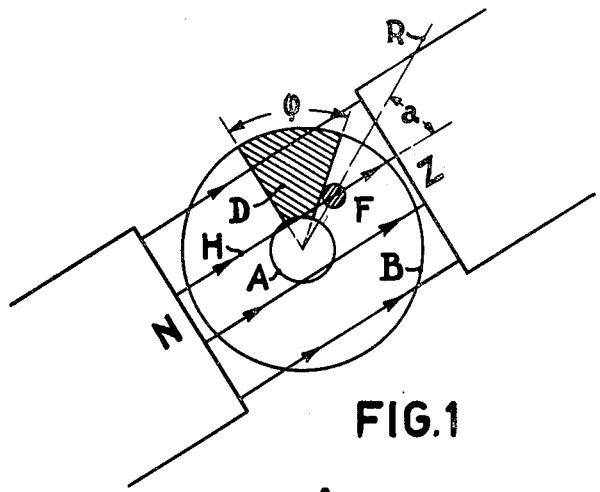

PLOT OF THE DAMPING OF WAVES AS A FUNCTION OF THE ANGLE α

INVENTOR.
HENDRIK BOSMA
BY
AGENT

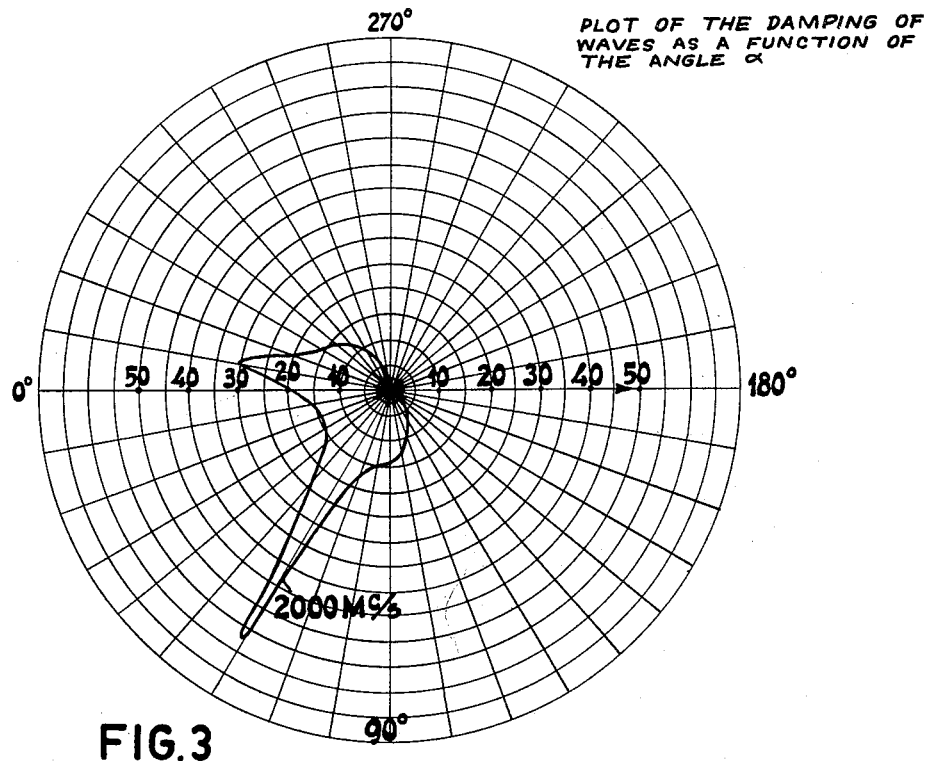
FIG.3 — PLOT OF THE DAMPING OF WAVES AS A FUNCTION OF THE ANGLE $\alpha$
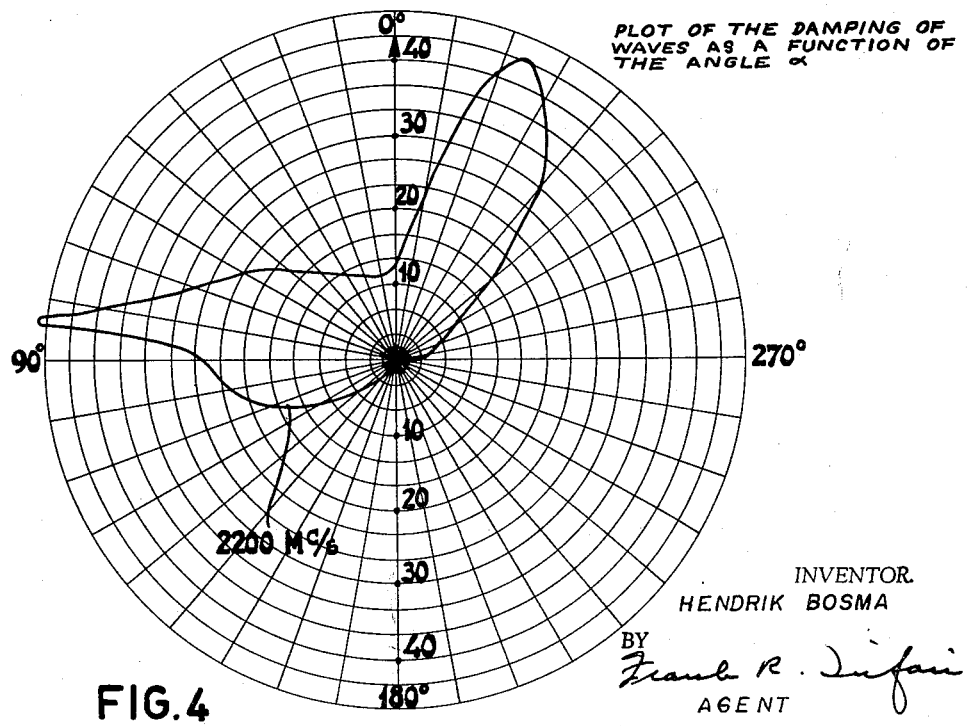
FIG.4 — PLOT OF THE DAMPING OF WAVES AS A FUNCTION OF THE ANGLE $\alpha$
INVENTOR.
HENDRIK BOSMA
BY
AGENT

3,135,931
DIRECTIONAL ISOLATOR EMPLOYING GYRO-MAGNETIC MATERIAL BIASED AT AN ANGLE TO INCREASE DAMPING
Hendrik Bosma, Eindhoven, Netherlands, assignor to North American Philips Company, Inc., New York, N.Y., a corporation of Delaware
Filed May 26, 1961, Ser. No. 112,867
Claims priority, application Netherlands July 16, 1960
2 Claims. (Cl. 333—24.2)

The invention relates to a directional isolator. By a directional isolator is to be understood a device in a high-frequency transmission line such that waves propagating in the one direction experience a high damping and waves propagating in the opposite direction experience a low damping. Such devices are used, for example, to isolate a generator from a load so that changes, if any, of the load cannot react upon the generator and consequently the load on the generator itself actually is constant.

In certain devices of this type, a member consisting of high-frequency magnetic material, for example ferrite, is provided in a wave guide in a place where a magnetic rotating field is present and the magnetic material is prepolarized at right angles to the rotating plane of the magnetic vector such that at the operating frequency, magnetic resonance occurs in the ferromagnetic material. The directions of rotation of the magnetic field are opposite for waves which propagate in opposite directions in the wave guide so that the direction of rotation for waves which propagate in the one direction is the same as that of the precession movement of the electron spin, so that a strong absorption of the waves occurs, while the direction of rotation for waves in the opposite direction is opposite to the precession movement, so that in this case the waves are damped only to a small extent.

Such absorption isolators cannot be used as such in concentric transmission line, because in such lines the magnetic lines of force form circles about the axis of the guide and consequently no places are present where a magnetic rotating field prevails.

It is already known that in a concentric line a rotating field may be produced all the same by providing through a part of the circumference between the inner and the outer guide a member consisting of dielectric material which extends in the axial direction through a certain distance. In this member radially directed displacement currents will occur which produce axially directed components of the magnetic field outside the dielectric material, which components are shifted through 90° in phase with respect to the tangential components. If the dielectric constant has a sufficiently high value, a magnetic rotation field will be present outside the dielectric material, the direction of rotation of which is dependent in turn on the direction of propagation of the waves in the concentric guide. In known devices, a member consisting of high-frequency magnetic material is provided in places where a magnetic rotating field prevails, in general in the proximity of a side wall of the dielectric member, which is prepolarized in a radial direction, that is to say parallel to the electric lines of force and consequently at right angles to the plane of rotation of the magnetic vector to be expected.

The quality of a directional isolator may be defined as the ratio of the damping in the cut-off direction to that in the pass direction.

The invention relates to a directional isolator in a concentric transmission line of the said type and provides an isolator, the quality of which is considerably higher than of the known devices.

The directional isolator according to the invention is characterized in that the direction of the prepolarizing field at the magnetic material is situated in a plane at right angles to the axis of the guide, it is true, but makes an angle with the radial direction lying between 20° and 80°.

The direction of the prepolarizing field consequently is not radial as is the case in the known devices.

In order that the invention may be readily carried into effect, one embodiment thereof will now be described in greater detail, by way of example, with reference to the accompanying drawings, in which FIG. 1 is a cross-sectional view of a directional isolator while the other figures relate to diagrams.

In the directional isolator shown in FIG. 1, a wedge-shaped member D consisting of dielectric material is provided between the inner guide A and the outer guide B of a concentric transmission line which member extends through a given distance, for example several wave lengths, in the direction of the axis of the transmission line. A cylindrical member F consisting of ferrite or another suitable high-frequency magnetic material is provided against a side face of the member D which member F likewise extends in the longitudinal direction and consequently runs parallel to the said side face. The transmission line is situated between the poles N and Z of an electromagnet not shown which causes a constant magnetic field H in the coaxial guide, the lines of force of which are at right angles to the axis of the guide and, at the member F, make an angle $a$ with the radial line R through this member.

In a concentric line, the electric lines of force normally extend in radial directions, while the magnetic lines of force form circles about the axis. Under the influence of the electric field, dielectric displacement currents will be produced in the member D which are directed substantially radially and are in phase with the electric field and consequently also with the tangential magnetic high-frequency field components. The dielectric displacement current produces axially orientated magnetic field components which have a phase difference with respect to the displacement current of 90° and will consequently also have a phase difference of 90° with respect to the tangential component.

By suitable choice of the angle $\varphi$ of the member D and of the dielectric constant it may be achieved that the amplitude of the axial components at the side face of the member D is equal to that of the tangential components, so that there a purely magnetic rotating field will occur. Should the angle $\varphi$ or the dielectric constant be larger, the place where the rotating field will occur will be spaced somewhat further from the said side face. However, it is of advantage to cause the rotating field to occur immediately at the side face, since in that case the member F may be provided against the side face of the member D. The strength of the field H is chosen so that the magnetic material at the operating frequency is in a magnetic resonance.

Figure 2:
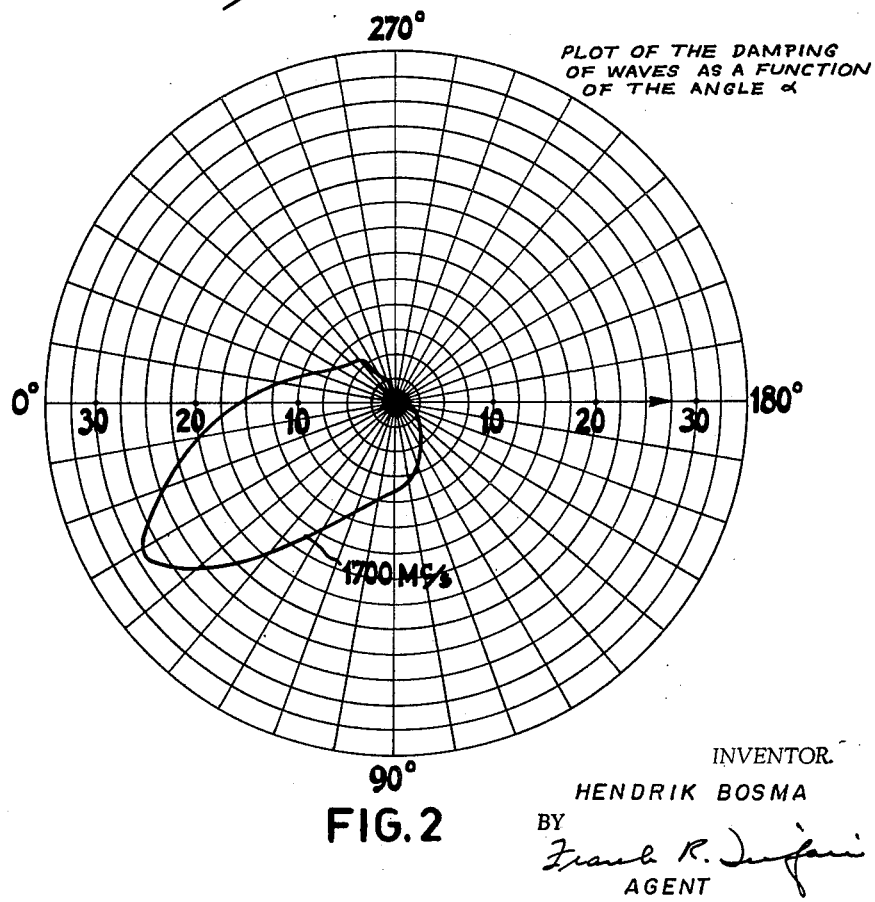

When rotating the wave guide about its axis, the angle $a$ changes. FIGS. 2, 3 and 4 show a number of measuring results in which a polar diagram the damping for waves in a definite direction of propagation is plotted in a radial direction as a function of the angle $a$, namely at the frequencies 1700 mc./s, 2000 mc./s. and 2200 mc./s., respectively. The inside and outside diameters of the concentric line in these measurements were 10 mm. and 23 mm. respectively, while the angle $\varphi$ was 30°. The member F consisted of yttrium iron garnet. The prepolarizing field at each frequency was adjusted at magnetic resonance of the magnetic material.

Figure 5:
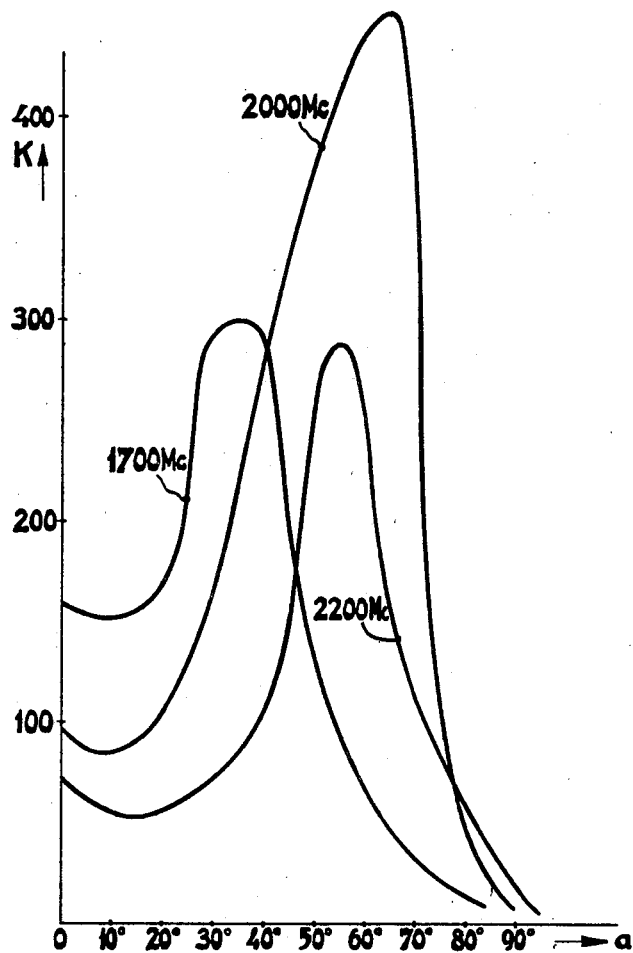

In FIG. 5, the ratio K between the damping in the cut-off direction and that in the pass direction is plotted as a function of the angle $a$. It appears from the figures that the maximum of the damping and of the relation K does not occur at $a=0°$, as were to be expected, but at an angle between 20° and 80° and that at the optimum angle $a$ the relation K between the cut-off damping and the pass damping is considerably larger than at 0°.

What is claimed is:

1. A nonreciprocal electromagnetic wave energy guiding structure comprising inner and outer longitudinally extending radially spaced apart coaxial conductors adapted to propagate wave energy of transverse magnetic field distribution, means for impressing said wave energy upon said conductors, a dielectric member positioned in the region between said inner and outer conductors and having a higher dielectric constant than the remainder of said region, said dielectric member extending between said inner and outer conductors and filling a predetermined sector of said region, an element of magnetically polarizable material exhibiting the gyromagnetic effect extending longitudinally in said region and positioned against one radially extending face of said dielectric member, and means for providing a biasing magnetic field in said element of sufficient strength to bring said element substantially into magnetic resonance at the frequency of said energy, the direction of said filed in said element in the plane normal to the axis of said conductors being within the 90 degree arc between a radial plane passing through said element and the normal to said face extending outwardly of said dielectric member, and being at an angle between 20 degrees and 80 degrees with a radial plane passing through said element.

2. A nonreciprocal electromagnetic wave energy guiding structure comprising inner and outer longitudinally extending radially spaced apart coaxial conductors adapted to propagate wave energy of transverse magnetic field distribution, means for impressing said energy upon said conductors, a dielectric member positioned in the region between said inner and outer conductors and filling a predetermined sector of said region, the dielectric constant of said member being greater than the dielectric constant of the remainder of said region whereby a rotating magnetic field is produced, a rod shaped element of magnetically polarizable material exhibiting the gyromagnetic effect positioned longitudinally in said region against one radally extending face of said member, said element being spaced from said conductors, and means for providing a biasing magnetic field in said element of sufficient strength to bring said element substantially into magnetic resonance at the frequency of said energy, the direction of said field in said element in the plane normal to the axis of said conductors being within the 90 degree arc between a radial plane passing through said element and the normal to said face extending outwardly of said dielectric member, and being at an angle between 20 degrees and 80 degrees with the radial plane passing through said element.

References Cited in the file of this patent

UNITED STATES PATENTS

| 3,012,203 | Tien | Dec. 5, 1961 |
| 3,013,229 | De Grasse | Dec. 12, 1961 |

FOREIGN PATENTS

| 216,857 | Australia | Aug. 27, 1958 |

OTHER REFERENCES

"Modern Advances in Microwave Techniques," edited by J. Fox, Brooklyn Polytechnic Institute, July 1955, pages 221–224.